Jan. 31, 1950
C. R. NANCE
2,495,754
SALVAGE VALVE
Filed Sept. 4, 1945
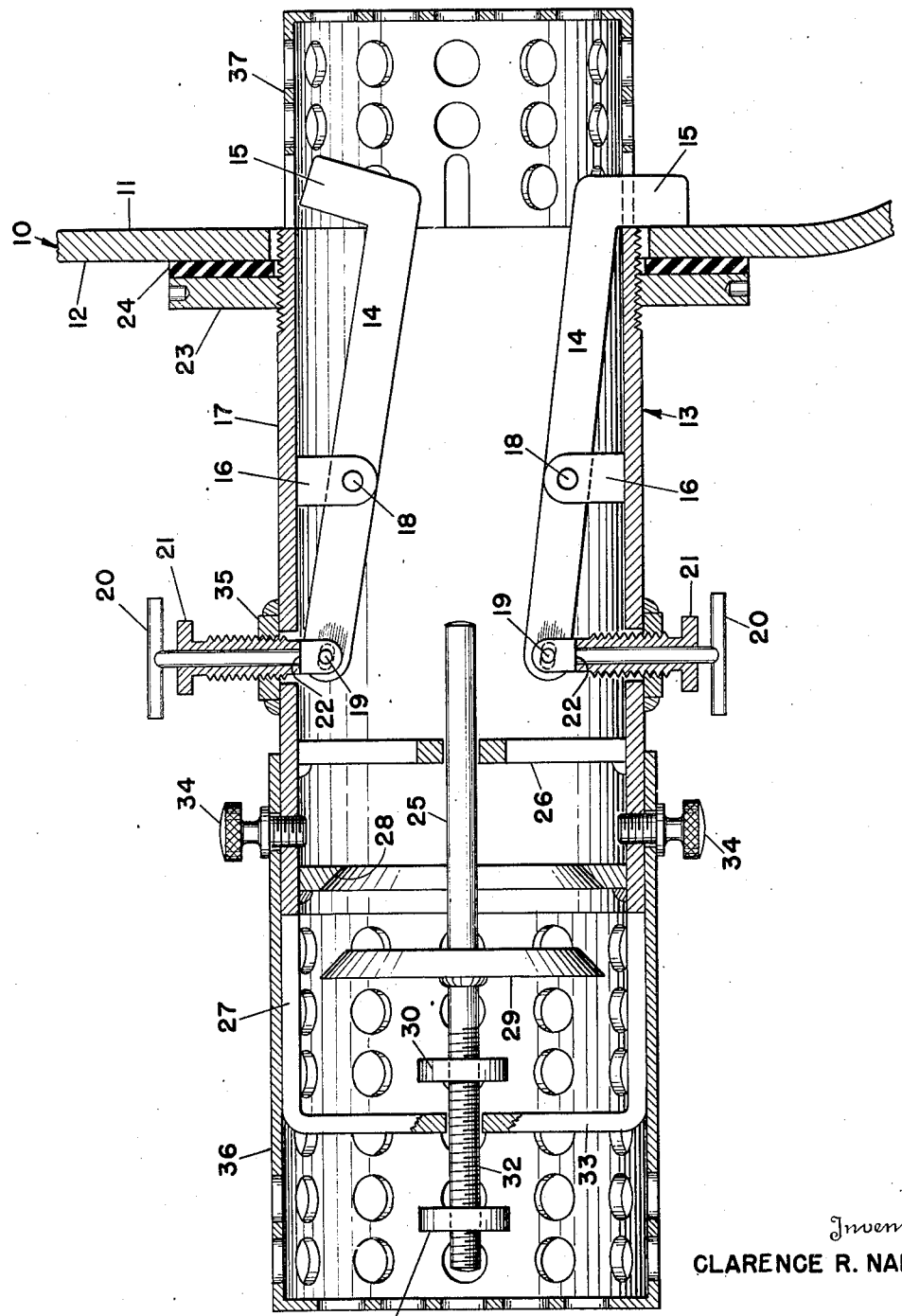
Inventor
CLARENCE R. NANCE
By Ralph L. Chappell
Attorney Patented Jan. 31, 1950

2,495,754

UNITED STATES PATENT OFFICE 2,495,754

SALVAGE VALVE

Clarence R. Nance, United States Navy

Application September 4, 1945, Serial No. 614,325

3 Claims. (Cl. 114—198)

(Granted under the act of March 3, 1883, as amended April 30, 1928; 370 O. G. 757)

This invention relates to valves which may be readily inserted and clamped in position within an orifice. The clamping means is operable entirely from the inserting side of the orifice.

More particularly this invention, as described in the illustrated embodiment, relates to a salvage valve of the stop-check type. Salvage valves of the stop-check type are widely used in ship salvage work for the purpose of compensating for rise and fall of the tide and the like.

Prior to these improvements the complicated designs and difficulties of installation of known stop valves occasioned considerable expense and required highly skilled divers, because they necessitated underwater cutting for a valve opening, matching of flange bolts, and in most instances the use of two divers, one inside and one outside the compartment to which the valve was being attached.

According to the present improvements, much of this difficulty is eliminated, and all that is required is a cutting of a valve opening, insertion of the valve through the opening and securing of the valve in position by means entirely on one side of the compartment. The simplicity of the invention reduces the cost of valve construction and enables a different class of labor to be used in their construction. It will release more skilled labor and machines for other activities.

The improved valve may have a strainer on each end to prevent clogging of the bore. The main body of the valve provides a passage for the fluid or liquid being controlled and may conveniently be formed from standard size pipe. A number of spaced dogs pivotally mounted within the bore of the valve, when in their expanded or clamping position, cooperate with a screw flange to securely clamp the valve to the materials adjacent the side of the valve opening or orifice. The dogs in retracted position preferably lie wholly within the outline of the valve body extended and their ends in expanded position project beyond the periphery of the valve body and through suitable openings of the inner attached strainer. The internal valve and valve stem is mounted for sliding movement on yoke and spider supports. Adjustable nuts on the screw threaded valve stem provide adjustments for locking the valve stem in any desired position as will be understood.

An object of the present improvements is to provide a readily attachable and removable valve.

Another object is to provide a valve including clamping means, for engaging the material on both sides of a valve opening, and operable by means on the valve from one side of said opening.

Another object is to provide a clamping attachment for valves including a set of pivotally mounted dogs which may assume a retracted position for insertion of the valve into a valve opening, and an expanded position to prevent withdrawal of the valve.

Another object is to provide a stop-check valve having a threaded body and flange together with a set of pivotally mounted dogs for clamping the valve in position.

These and other objects will be manifest from a consideration of the description claims and drawings in which:

The figure is an exploded partly sectional and diagrammatic view of the protecting strainers and my valve structure associated with a valve opening in a ship's hull.

Referring to the figure of the drawing, a ship's hull 10 is provided with an orifice or valve opening. The inside surface 11 and outside surface 12 of the hull constitute the main supporting surfaces for my improved valve generally depicted at 13.

Dogs having a leg portion 14 and a foot portion 15 are pivotally movable from retracted position as shown at the top of the figure to their expanded position in the lower portion. A group of supports 16 are spaced about the inside of the valve body 17 and carry fixed studs 18 about which the right angle dogs pivot. The number of dogs to be used will, of course, depend on the size of the valve. The inner end of the dog members are longitudinally slotted to engage studs 19 on handles 20 which project through the valve body 17 and adjustable screws 21. Turning of the screws 21 will cause the end of the screws to engage shoulders 22 and to move the dogs into expanded or locking position. When the screws 21 are backed off the dogs may be retracted manually by pulling on handles 20. The top dog may assume retracted position by gravity but the lower dog or dogs will be withdrawn by a pull on the handles.

The securing end of valve body 17 is threaded and a threaded brass flange 23 is manually movable longitudinally of this portion to press against the rubber gasket 24. When the foot portions 15 of the dogs are in expanded portion movement of the flange toward them and the gasket 24 will clamp the valve securely in position and effect a water seal.

The known valve stem 25 is diagrammatically shown as supported for lengthwise movement by 4-legged spider 26 and the ends of yoke portion 27. The port 28 will be closed by the seating of beveled plate 29 which is integral with the valve stem. Adjustable nuts 30 and 31 can be moved along the threaded portion 32 of valve stem 25 to lock the valve in open, closed or any intermediate position. This adjustment is normally made prior to descending below the water.

As will be understood the four legs of spider 26 supporting the valve stem 25 permit passage of water as does the yoke portion 27 of the valve. The yoke is open at the sides and end except for supporting members 33 for the valve stem.

Screw grips 34 are convenient means for handling the valve, and retaining the strainer 36 in position. The clamping portion and valve portion are secured together as by welding to band 35.

Strainer 36 and 37 are affixed in any convenient manner to the ends of the valve. Strainer 36 is, of course, provided with openings through which the foot 15 of the dogs move.

From a consideration of the above it will be seen that I have provided an inexpensive, readily securable valve and clamping means. It will be understood that my device may be used in a variety of sizes and with various modification of detail. Four dogs are sufficient for use with 5-inch valves although larger sizes may require a greater number.

The invention herein described and claimed may be manufactured and used by or for the Government of the United States of America for governmental purposes without the payment of any royalties thereon or therefor.

Having described my invention in a preferred embodiment, I desire to be limited only by the scope of the following claims:

1. In a valve, a body portion providing a bore for the passage of fluid, a threaded portion on said body, means for securing said valve through an orifice, said means comprising a plurality of supports fixed to the body portion in spaced relation within the bore, angular dog members individually mounted for pivotal movement on said supports, means for pivotally and individually moving each of said angular dog members from a position wholly within the outline of the body portion to a position beyond the outline of the body portion and means cooperating with the angular dog members for clamping the valve to the material about the orifice, said last named means comprising a threaded flange movable along said threaded portion of said bore.

2. A salvage valve which may be secured within an underwater orifice in a ship's hull, said valve having a body portion which provides a bore for the passage of fluid, strainers substantially covering the ends of the body portion to prevent fouling of the valve by foreign matter, clamping means including retractable and expandable members individually controllable for movement into position and a cooperating flange, the strainer at one end of said body portion having perforations adapted to permit a portion of each member to project therethrough said members and flange being manually movable from one side of the ship's hull to securely fix the valve in operative position.

3. A valve which may be secured in position within an orifice, said valve having a body portion which provides a bore for the passage of a fluid, clamping means for securing said valve to the material adjacent the sides of an orifice, said clamping means including a plurality of supports fixed to the body portion in spaced relation within the bore, right angle members individually mounted for pivotal movement on said supports, means connected near the ends of the right angle members and projecting through the body portion, individually adjustable means for engaging the projecting means to pivotally move each right angle member, and a screw threaded flange on the body portion longitudinally movable to and away from the ends of the right angle members.

CLARENCE R. NANCE.

REFERENCES CITED

The following references are of record in the file of this patent:

UNITED STATES PATENTS

| Number | Name | Date |
| --- | --- | --- |
| 551,829 | Mitchell | Dec. 24, 1895 |
| 567,115 | Atkinson et al. | Sept. 1, 1896 |
| 945,517 | Goodwin | Jan. 4, 1910 |
| 998,352 | Kublin | July 18, 1911 |
| 1,367,250 | Gray | Feb. 1, 1921 |
| 1,493,293 | Timberlake | May 6, 1924 |
| 1,547,934 | McCormick | July 28, 1925 |
| 1,657,404 | Kuehne | Jan. 24, 1928 |
| 2,045,975 | Anschicks | June 30, 1936 |